United States Patent [19]
Nasserbakht et al.

[11] Patent Number: 5,809,514
[45] Date of Patent: Sep. 15, 1998

[54] MICROPROCESSOR BURST MODE DATA TRANSFER ORDERING CIRCUITRY AND METHOD

[75] Inventors: Mitra Nasserbakht, Dallas; Uming Ko, Plano, both of Tex.

[73] Assignee: Texas Instruments Incorporated, Dallas, Tex.

[21] Appl. No.: 805,821

[22] Filed: Feb. 26, 1997

[51] Int. Cl.$^6$ .............................. G06F 12/00; G06F 13/00
[52] U.S. Cl. ............................... 711/3; 711/100; 711/118; 711/130; 711/147; 711/154
[58] Field of Search ................................ 711/3, 100, 118, 711/130, 147, 154, 156

[56] References Cited

U.S. PATENT DOCUMENTS

| | | | |
|---|---|---|---|
| 4,161,024 | 7/1979 | Joyce et al. | 711/121 |
| 4,167,782 | 9/1979 | Joyce et al. | 711/141 |
| 4,214,303 | 7/1980 | Joyce et al. | 711/118 |
| 4,219,883 | 8/1980 | Kobayashi et al. | 365/189.02 |
| 4,471,429 | 9/1984 | Porter et al. | 711/141 |
| 4,583,165 | 4/1986 | Rosenfeld | 711/141 |
| 5,263,144 | 11/1993 | Zurawski et al. | 711/100 |
| 5,398,325 | 3/1995 | Chang et al. | 711/100 |
| 5,537,575 | 7/1996 | Foley et al. | 711/141 |
| 5,588,131 | 12/1996 | Borrill | 711/146 |
| 5,623,629 | 4/1997 | Suzuki | 711/141 |

*Primary Examiner*—Tod R. Swann
*Assistant Examiner*—Tuan V. Thai
*Attorney, Agent, or Firm*—Robert D. Marshall, Jr.; James C. Kesterson; Richard L. Donaldson

[57] ABSTRACT

The present invention provides a method for transferring groups of data between a microprocessor cache memory (114) and an external memory (105) across a data bus (Bbus). Each group of data includes as many bits of data as the width of the bus (Bubs) with the total amount of data transferred filling a line in the cache memory (114). The bus interface unit (112) of the microprocessor (110) initiates a burst read by starting a read request, asserting the address strobe bit and sending the initial requested address on the external bus address bits of the microprocessor (110). The external system will then respond by asserting a burst ready signal, followed by the data bits residing in the appropriate address position. The particular addresses for this data is selected according to the current burst mode, which may be high performance, low power or compatible with a previously known burst mode. Subsequent groups of data are then sent in subsequent cycles according to the prescribed order of the burst mode up to n (=B/b) transfers. In a high performance mode the first group of bytes requested are always returned first. The next transfer will supply the necessary data that will satisfy the next level of data size hierarchy. Thereafter, transfer order follows an increasing wrap-around order. A low power mode includes an initial data order similar to the high performance mode with the additional limitation that only one address bit changes for each sequential data group. A burst write is performed similarly.

24 Claims, 4 Drawing Sheets

Fig. 1

| 8-BYTE STARTING ADDRESS | 1ST ADDRESS TRANSFER | 2ND ADDRESS TRANSFER | 3RD ADDRESS TRANSFER | 4TH ADDRESS TRANSFER |
|---|---|---|---|---|
| 0 (00) | 00 | 01 | 10 | 11 |
| 1 (01) | 01 | 00 | 10 | 11 |
| 2 (10) | 10 | 11 | 00 | 01 |
| 3 (11) | 11 | 10 | 00 | 01 |

*Fig.2*

| 8-BYTE STARTING ADDRESS | 1ST ADDRESS TRANSFER | 2ND ADDRESS TRANSFER | 3RD ADDRESS TRANSFER | 4TH ADDRESS TRANSFER |
|---|---|---|---|---|
| 0 (00) | 00 | 01 | 11 | 10 |
| 1 (01) | 01 | 00 | 10 | 11 |
| 2 (10) | 10 | 11 | 01 | 00 |
| 3 (11) | 11 | 10 | 00 | 01 |

*Fig.3*

| 8-BYTE STARTING ADDRESS | 1ST ADDRESS TRANSFER | 2ND ADDRESS TRANSFER | 3RD ADDRESS TRANSFER | 4TH ADDRESS TRANSFER |
|---|---|---|---|---|
| 0 (00) | 00 | 01 | 10 | 11 |
| 1 (01) | 01 | 00 | 11 | 10 |
| 2 (10) | 10 | 11 | 00 | 01 |
| 3 (11) | 11 | 10 | 01 | 00 |

*Fig.4* PRIOR ART

| 8-BYTE STARTING ADDRESS | 1ST ADDRESS TRANSFER | 2ND ADDRESS TRANSFER | 3RD ADDRESS TRANSFER | 4TH ADDRESS TRANSFER |
|---|---|---|---|---|
| 0 (00) | 00 | 01 | 10 | 11 |
| 1 (01) | 00 | 01 | 10 | 11 |
| 2 (10) | 10 | 11 | 00 | 01 |
| 3 (11) | 10 | 11 | 00 | 01 |

| 12-BYTE STARTING ADDRESS | TRANSFER ADDRESS | | | | | | | |
|---|---|---|---|---|---|---|---|---|
| | 1ST | 2ND | 3RD | 4TH | 5TH | 6TH | 7TH | 8TH |
| 0 (000) | 000 | 001 | 010 | 011 | 100 | 101 | 110 | 111 |
| 1 (001) | 001 | 010 | 011 | 000 | 100 | 101 | 110 | 111 |
| 2 (010) | 010 | 011 | 000 | 001 | 100 | 101 | 110 | 111 |
| 3 (011) | 011 | 010 | 000 | 001 | 100 | 101 | 110 | 111 |
| 4 (100) | 100 | 101 | 110 | 111 | 000 | 001 | 010 | 011 |
| 5 (101) | 101 | 110 | 111 | 100 | 000 | 001 | 010 | 011 |
| 6 (110) | 110 | 111 | 100 | 101 | 000 | 001 | 010 | 011 |
| 7 (111) | 111 | 100 | 101 | 110 | 000 | 001 | 010 | 011 |

Fig.7

| 12-BYTE STARTING ADDRESS | TRANSFER ADDRESS | | | | | | | |
|---|---|---|---|---|---|---|---|---|
| | 1ST | 2ND | 3RD | 4TH | 5TH | 6TH | 7TH | 8TH |
| 0 (000) | 000 | 001 | 010 | 011 | 111 | 110 | 100 | 101 |
| 1 (001) | 001 | 000 | 010 | 011 | 111 | 110 | 100 | 111 |
| 2 (010) | 010 | 011 | 001 | 000 | 100 | 101 | 111 | 110 |
| 3 (011) | 011 | 010 | 000 | 001 | 100 | 101 | 111 | 110 |
| 4 (100) | 100 | 101 | 111 | 110 | 010 | 011 | 001 | 000 |
| 5 (101) | 101 | 111 | 110 | 100 | 000 | 001 | 010 | 011 |
| 6 (110) | 110 | 111 | 101 | 100 | 000 | 001 | 010 | 011 |
| 7 (111) | 111 | 101 | 100 | 110 | 010 | 011 | 001 | 000 |

Fig.8

MICROPROCESSOR BURST MODE DATA TRANSFER ORDERING CIRCUITRY AND METHOD

TECHNICAL FIELD OF THE INVENTION

This invention relates to methods and apparatus for transferring data in burst mode between a memory system and a microprocessor.

BACKGROUND OF THE INVENTION

In a generalized microprocessor, data must be transferred from the external environment of the microprocessor integrated circuit to the microprocessor via an external bus. As microprocessors become more complex and operate at higher and higher clock speeds, there is an ever increasing need to transfer data more quickly through this interface. Caches located on the same integrated circuit as the microprocessor have been used in order to reduce the rate at which the microprocessor needs to communicate via the external bus. As these on-chip caches grow in size and complexity, for example by having multiple levels, line size in bits per cache line also increases.

In order to perform on-chip transactions efficiently, that is, with minimum processor clock cycles expended in storing and retrieving data, there are typically two main data buses transferring data between the microprocessor's Bus Interface Unit ("BIU"), which manages data transfers between the microprocessor and the outside world, and the on-chip cache. Thus, there is an internal data bus between the on-chip cache and the BIU, and there is an external data bus between the BIU and the outside world. The width of the internal data bus is designed with an eye to the cache line size so as to optimize efficiency of transfers to and from the cache. However, the width of the external data bus is determined by the environment in which the microprocessor is to operate, the external memory system. Transfers of data from the external environment are limited by the external bus size. The maximum amount of data that can be transferred in any given transfer to or from the external environment is the number of bits that the external bus is wide. Current bus sizes include 32 bits and 64 bits, and therefore groups of bytes can be transferred in a single one of such transfers. Nonetheless, it is desirable to fill an entire line of the cache with address contiguous data, which may require the transfer of more than one such group of bytes. In general, since the internal bus width B is larger than the external bus width b, several transfers are required to read in or write out data requested by the processor, as well as to write out data requested of the processor by some external bus master, in what is frequently referred to as "bus snooping".

The burst method of data transfer is a way to reduce the total number of cycles required to perform the above-described transfers. There are several methods of performing such a burst transfer. The goal in such methods is to devise a mechanism in the BIU allowing all the bits necessary to fill an entire cache line to be transferred at the onset of the transaction designated by the ready signal. There are several well-known methods for accomplishing this. One of the primary parameters that is controlled in such methods is the order in which the groups of bytes are transferred, called the "burst order." One common burst order is to transfer data from address zero of the line, sequentially in ascending address order. For example, the following are a possible set of transactions for a B/b ratio of four following this burst order, where the "transfer address" is the address for the group of bytes transferred in the indicated cycle. The addresses are given in binary, for convenience. This burst order could be used for all data transfers regardless of the particular address needed.

TABLE 1

| Cycle | Transfer Address |
| --- | --- |
| 1 | 00 |
| 2 | 01 |
| 3 | 10 |
| 4 | 11 |

Another burst order involves the transfer the first requested address, then transfer the remaining addresses in a sequential manner utilizing a wrap-around at the end. For example, the following are a possible set of transactions for a B/b ratio of four following this burst order. In this example the microprocessor starts the burst desiring the data at address "10."

TABLE 2

| Cycle | Transfer Address |
| --- | --- |
| 1 | 10 |
| 2 | 11 |
| 3 | 00 |
| 4 | 01 |

For patents dealing with burst modes see: U.S. Pat. No. 4,638,451, entitled MICROPROCESSOR SYSTEM WITH PROGRAMMABLE INTERFACE, issued to Richard K. Hester and Tan Khen-Sang on Jan. 20, 1987, and commonly assigned with this application; U.S. Pat. No. 5,131,083, entitled METHOD OF TRANSFERRING BURST DATA IN A MICROPROCESSOR, issued to John H. Crawford, et al. on Jul. 14, 1992, and assigned to Intel Corporation; and U.S. Pat. No. 5,255,378, entitled METHOD OF TRANSFERRING BURST DATA IN A MICROPROCESSOR, issued to John H. Crawford, et al. on Nov. 24, 1992, and assigned to Intel Corporation.

When using burst mode, it is desirable to optimize the rate at which data is supplied to and from the microprocessor. This may be achieved by ordering the burst data transfer so that the data is transferred from external devices so the that it is usable as soon as possible by the microprocessor. It is also desirable that burst transfers be done utilizing as little power as possible. This is especially important where the microprocessor is used in low power applications, such as in laptop or notebook computers. Finally, it is desirable to provide compatibility with widely used burst ordering schemes.

SUMMARY OF THE INVENTION

The present invention relates to methods and circuitry pertaining to the transfer of data between a microprocessor and an external memory system for different internal-to-external bus width ratios. This data transfer could be a data read, in which data from the external memory is transferred to the microprocessor. This data transfer could also be a data write, in which data in the microprocessor is transferred to the external memory. For such a generalized system, the number of clock cycles required depends on the width ratio of the two buses as follows. For B/b=n, in order for the microprocessor to receive all pieces of data by single transfers, it requires, first, a ready signal to be sent out, which takes one cycle, and, second, for correct data to be presented on the data lines and the valid data bits asserted, which takes an additional cycle, with all of these operations being repeated n times. For example, for a system in which b=256 and B=64, n is 4 and, therefore, a total of 8 cycles are required for all pieces of data to be transferred.

The present invention provides a method for transferring groups of data between a microprocessor cache memory and an external memory across a data bus in response to a request for one or more bytes of data. The cache memory is wherein the external memory is divided into two or more banks of memory. The cache memory is divided into two or more lines of memory. Each group of data includes as many bits of data as the width of the bus. The method provides for the transferring of the data in response to a single data transfer command. The total amount of data transferred in response to the request fills a line in the cache memory. The method involves the following steps. The bus interface unit of the microprocessor initiates a burst read by starting a read request, asserting the address strobe bit and sending the initial requested address on the external bus address bits of the microprocessor. The external system will then respond by asserting a burst ready signal, followed by the data bits residing in the appropriate address position. The particular addresses for this data is selected according to the current burst mode, which may be high performance, low power or compatible with a previously known burst mode. Subsequent groups of data are then sent in subsequent cycles according to the prescribed order of the burst mode up to n (=B/b) transfers. In the high performance mode the first group of bytes requested are always returned first. To accommodate the next higher level of data size hierarchy, the next transfer will supply the necessary data that will satisfy the next level of data size hierarchy. Thereafter, transfer order follows an increasing wrap-around order. The low power mode includes an initial data order similar to the high performance mode with the additional feature that only one address bit changes for each sequential data group. A burst write is performed similarly, by the microprocessor starting a write request, asserting the address strobe bit and sending the initial requested address on the external bus address bits. The external system will then respond by asserting a burst ready signal, indicating it is ready to receive the data to be written at the initial address indicated by either the selected burst mode of data transfer. Subsequently, the bus interface will then assert additional groups of data bits on the microprocessor's data bus for up to n (=B/b) transfers.

The present invention provides these and other advantages and features of the, as will be apparent to those skilled in the art from the following detailed description of the invention, taken together with the accompanying drawings.

BRIEF DESCRIPTION OF THE DRAWINGS

These and other aspects of this invention are illustrated in the drawings, in which.

DETAILED DESCRIPTION OF PREFERRED EMBODIMENTS

Some advanced microprocessors, as part of their memory system have three levels of on-chip cache. As one moves "up" the memory hierarchy of such cache levels, away from the processor core toward the BIU, the overall size of the caches and their line size increase. Applying the concepts discussed in the Background section, above, where the internal to external bus width ratio was represented as B/b, or n, the internal bus width in such advanced microprocessors refers to the bus width between the highest level of cache on-chip (closest to the BIU) and the BIU. Data is transferred between the highest level cache and the BIU via a bus that is B wide.

Figure 1:
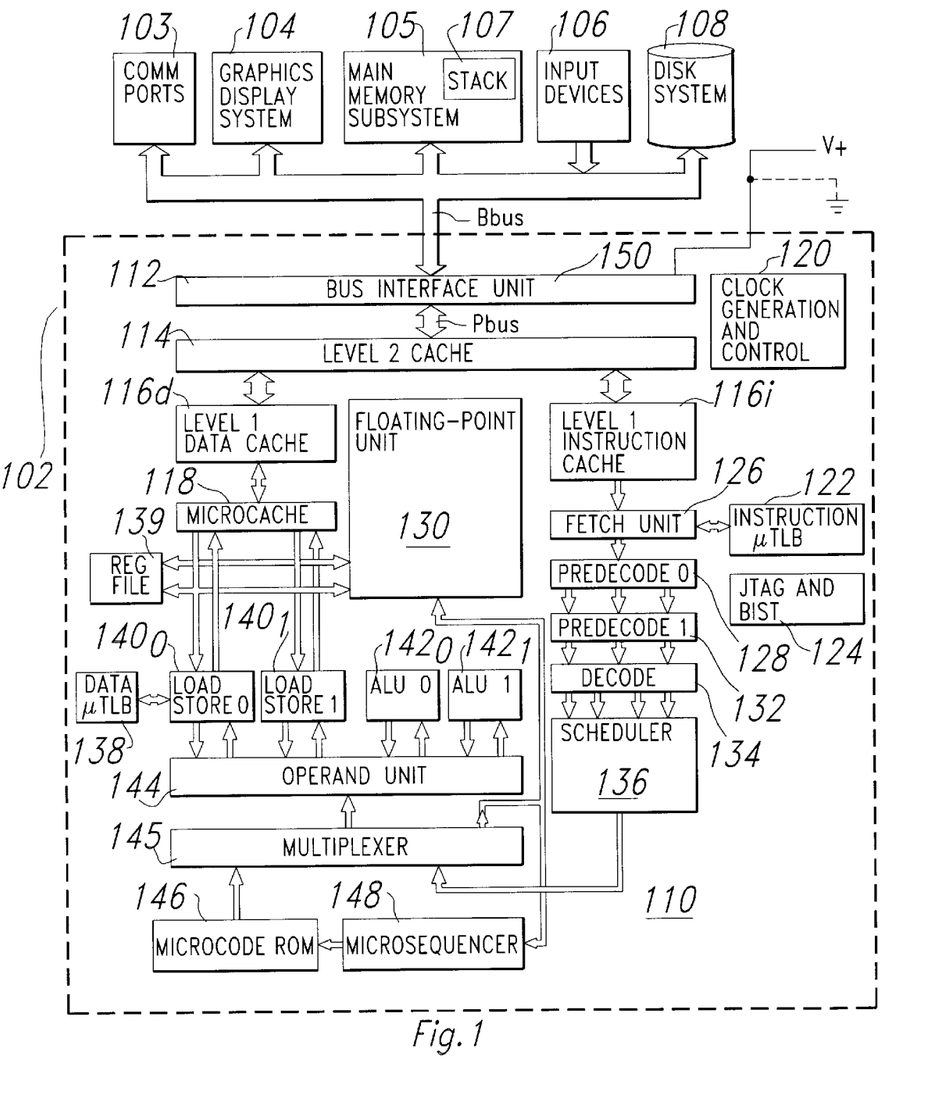
FIG. 1 is a block diagram showing a typical configuration of a microprocessor including a multi-level internal memory system.

FIG. 1 illustrates a block diagram of a microprocessor embodiment into which the above embodiments may be incorporated. FIG. 1 illustrates an exemplary data processing system 102, including an exemplary superscalar pipelined microprocessor 110 which implements the preferred embodiment of the invention. It is to be understood that the architecture of system 102 and of microprocessor 110 is described herein by way of example only. It is contemplated that the present invention may be utilized in microprocessors of various architectures, with particular benefit to those of the superscalar type. It is therefore contemplated that one of ordinary skill in the art, having reference to this specification, will be readily able to implement the present invention in these other microprocessor architectures.

FIG. 1 illustrates microprocessor 110 as connected to other system devices by way of bus Bbus. While Bbus is shown in this example as a single bus, it is of course contemplated that Bbus may represent multiple buses having different speeds and protocols. The single bus Bbus illustrated in FIG. 1 serves merely by way of example due to its simplicity. Data processing system 102 contains the conventional subsystems: communication ports 103, which typically may include modem ports and modems, network interfaces, and the like; graphics display system 104, which typically may include video memory, video processors and a graphics monitor; main memory system 105, which is typically implemented by way of dynamic random access memory (DRAM); input devices 106, which typically may include a keyboard, a pointing device, and the corresponding interface circuitry; and disk system 108, which typically may include hard disk drives, floppy disk drives, and CD ROM drives. It is therefore contemplated that system 102 of FIG. 1 corresponds to a conventional desk top computer or workstation. Those skilled in the art would recognize that other system implementations of microprocessor 110 can also benefit from the present invention.

Microprocessor 110 includes bus interface unit (BIU) 112 that is connected to Bbus. Bus interface unit 112 controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with Bbus timing constraints. Microprocessor 110 also includes clock generation and control circuitry 120 which, in this exemplary microprocessor 110, generates internal clock phases based upon the bus clock from Bbus. The frequency of the internal clock phases is selectably programmable in this example as a multiple of the frequency of the bus clock. BIU 112 is connected to an external pin 150 of the integrated circuit including microprocessor 110. In a manner more particularly described below, BIU 112 selects between burst transfer orders depending upon the voltage sensed at external pin 150 upon RESET, such as during initial application of electrical power.

As is evident in FIG. 1, microprocessor 110 has three levels of internal cache memory. The highest level of cache memory is designated as level 2 cache 114. Level 2 cache 114 is connected to BIU 112 via bus Pbus. In this example, level 2 cache 114 is a unified cache and is configured to receive all cacheable data and cacheable instructions from Pbus via BIU 112. Much of the bus traffic presented by microprocessor 110 is accomplished via level 2 cache 114. Of course, microprocessor 110 may also effect bus traffic around cache 114, by treating certain bus reads and writes as "not cacheable." As shown in FIG. 1, Level 2 cache 114 is connected to two level 1 caches 116. Level 1 data cache $116_d$ is dedicated to data, while level 1 instruction cache $116_i$ is dedicated to instructions. Power consumption by microprocessor 110 is minimized by only accessing level 2 cache 114 only in the event of cache misses of the appropriate one of the level 1 caches 116. On the data side, microcache 118 is provided as a level 0 cache. In this example microcache 118 is a fully dual-ported cache.

As shown in FIG. 1 and as noted hereinabove, microprocessor 110 is of the superscalar type. In this example multiple execution units are provided within microprocessor 110, allowing up to four instructions to be simultaneously executed in parallel for a single instruction pointer entry. These execution units include: two arithmetic logic units (ALU) $142_0$, $142_1$ for processing conditional branch, integer, and logical operations; floating point unit (FPU) 130; two load/store units $140_0$, $140_1$; and microsequencer 148. The two load/store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple seven stage pipeline These stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86 type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write back : This stage stores the results of the execution in registers or in memory |

Referring back to FIG. 1, the pipeline stages noted above are performed by various functional blocks within microprocessor 110. Fetch unit 126 generates instruction addresses from the instruction pointer, by way of instruction micro-translation lookaside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128 determines the size and position of as many as three x86 instructions (which are variable length). Predecode 0 unit 128 consists of three instruction recognizers. Predecode 1 unit 132 recodes the multi-byte instructions into a fixed length format, to facilitate decoding.

Decode unit 134, in this example, contains four instruction decoders. Each instruction decoder is capable of receiving a fixed length x86 instruction from predecode 1 unit 132 and producing from one to three atomic operations (AOps). The AOps are substantially equivalent to reduced instruction set computer (RISC) instructions. Three of the four decoders operate in parallel, placing up to nine AOps into the decode queue at the output of decode unit 134 to await scheduling. The fourth instruction decoder is reserved for special cases. Scheduler 136 reads up to four AOps from the decode queue at the output of decode unit 134, and assigns these AOps to the appropriate execution units. Operand unit 144 receives and prepares the operands for execution. As illustrated in FIG. 1, operand unit 144 receives an input from scheduler 136 and also from microcode ROM 146, via multiplexer 145, and fetches register operands for use in the execution of the instructions. Operand unit 144 performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. For microprocessor 110 of this example, such microcoded microinstructions may include complex or rarely used x86 instructions, x86 instructions that modify segment or control registers, handling of exceptions and interrupts, and multi-cycle instructions (such as REP instructions, and instructions that PUSH and POP all registers).

Microprocessor 110 also includes test circuitry 124 for controlling the operation of JTAG scan testing, and of certain built-in self-test functions. Test circuitry 124 ensures the validity of the operation of microprocessor 110 upon completion of manufacturing, and upon resets and other events.

Given the description of FIG. 1, one skilled in the art would appreciate that the embodiments of the invention described below may be incorporated into microprocessor 110, such as within microsequencer 148. Various related functionality may be further performed by the appropriate circuitry within FIG. 1.

The bus widths and line sizes for the exemplary microprocessor 110 of FIG. 1 are designated in Table 3. The general identifiers are represented by algebraic notation, such as "L" for the Level 0 cache line size, and exemplary values for such widths and sizes are shown following the equal sign (=).

TABLE 3

|  | Line Size | Bus Width |
| --- | --- | --- |
| Execution Units | N/A | L = 64 bits |
| Level 0 cache | L = 64 bits | Don't Care |
| Level 1 cache | 2L = 128 bits | Don't Care |
| Level 2 cache | 4L = 512/256 bits | B = 256 bits |
| Bus Interface Unit | N/A | b = 64 bits |

Data "coming up" the memory hierarchy, that is, being transferred from lower cache levels to higher cache levels, from the microprocessor core toward the BIU 112, is aligned at the appropriate byte boundary for that level, according to the known art. Higher microprocessor performance is achieved if requests for all levels of the hierarchy are satisfied in a way such that the execution stages of the processor core are supplied with data with the fastest possible turnaround time.

With this in mind, the burst order according to the preferred embodiment of the present invention, for high performance, satisfies the following objectives:

1) The first group of bytes, in this case L/8 bytes (L bits), requested are always returned first. This supplies the execution units with the necessary data to resume execution while the rest of the transfers take place. Concurrent with the provision of the first L/8 bytes to the execution units, the L0 cache is also loaded with these same L/8 bytes.

2) To accommodate the next higher level of the hierarchy, in this case the L1 cache, aligned at L/4 byte boundary, the next transfer will supply the necessary data that will complete the L/4 bytes, which will satisfy the next level of the hierarchy.

3) Once the above requirements, in 1) and 2), are satisfied, the transfer order follows an increasing wrap-around order.

This technique is based upon data width requirements being generally expressed in the form of $2^N$, where N is an integer. The first group of bytes transferred in 1) above satisfies the immediate data requirement. The second group of bytes transferred in 2) above serves to fill the next larger data size with the second half of that next larger data size. If the first data size is $2^N$, then the second data size is $2^N=1$. Once the data transfers in 1) and 2) above take place, there is substantially no difference in the effect on processor performance between the selection of possible orders in which the remaining bytes are transferred. This is because both the third and the fourth data groups are required to make up a total data transfer of $2^N+2$ data bits. Thus receipt of either the third or the fourth data group would not fill out this the next larger data size. The scheme described above can simplify hardware by keeping the same order for the last two transfers, until all bytes are transferred.

Data transfers in the preferred embodiment, using the exemplary sizes presented above, are performed in groups of four eight byte bursts, such that thirty two bytes are transferred in a given overall burst group. Eight bytes are transferred together because the data bus is sixty four bits wide (one byte=eight bits). Alignment of data is at sixteen byte boundaries.

Figure 2:
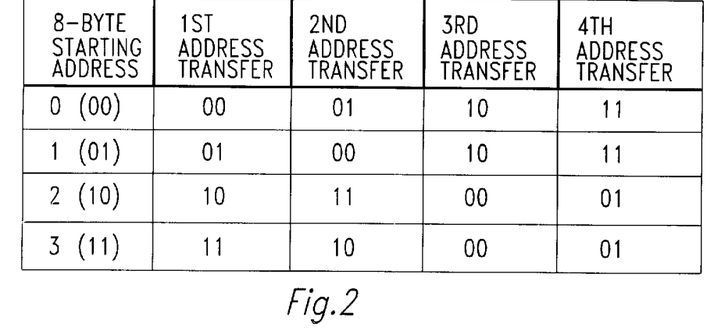
FIG. 2 is a table showing the sequence of data transfer in the high performance mode of a preferred embodiment of the present invention in which the burst occurs in four cycles.

FIG. 2 is a table showing the sequence of data transfer in the high performance mode, using the exemplary sizes presented above, for several starting addresses. The first column in the table contains the starting address for the burst operation. This address is generally the address for the group of eight bytes of data containing the data for the current operation of the microprocessor. Thus, assuming the complete address is thirty bits in size, the two bits representing the address for the group of eight bytes of data are the fourth and fifth least significant bits:

$$\text{xxxxxxxx xxxxxxxx xxxxxxxx xxxAAddd}$$

where: bits x are higher order address bits which are the same for all data groups within a burst transfer; bits A are the address bits for the individual groups of eight bytes; and bits d are the address bits for individual bytes within the group of eight bytes. Note that larger or smaller addresses would be the same except that the number of higher order address x, which are identical for all data groups within the burst, would differ. Also note that the lower order bits d, which specify individual bytes of data, may not necessarily be transmitted to main memory system 105 if all bus transfers take place in groups of 8 bytes. Thus the minimum amount of data transferred via Bbus may be larger than the minimum addressable data size. Note also that the number of lower order bits d are set by the relationship of the minimum data size and the Bbus width b. In this example the minimum data size is 1 byte and the Bbus width is 8 bytes. This results in the need for 3 lower order bits d because $2^3=8$. Other relationships are feasible and within the scope of this invention.

The second column of FIG. 2 contains the initial address AA of the first eight bytes of data to be transferred in the burst. The third, fourth and fifth columns contain the initial addresses AA of the second, third and fourth groups of eight bytes of data to be transferred in the burst, respectively.

As can be seen, the first eight bytes requested by the microprocessor are returned in the first data transfer for maximum system performance. This is revealed because the starting address listed the first column equals the first transfer address listed in the second column. The remaining bits are returned in accordance with steps 2) and 3) above. The first two groups of eight bytes, those with initial addresses of "00" and "01", are considered the "bottom half" of the transfer. The second two groups of eight bytes, those with initial addresses of "10" and "11", may be considered the "top half" of the transfer. The second data transfer always completes the bottom half if the initial data transfer was from the bottom half or the top half if the initial data transfer was from the top half. The third and fourth data transfers fill the other half opposite the half of the initial data transfer. As noted above, the next larger data size would require both these data groups, thus there is essentially no performance difference with a change in order of the third and fourth data transfers. As noted above, FIG. 2 illustrates an embodiment selected for circuit simplicity. The upper half data transfers take place at address "10" followed by address "11" regardless of the starting address. The lower half data transfers take place at address "00" followed by address "01" regardless of the starting address.

Figure 3:
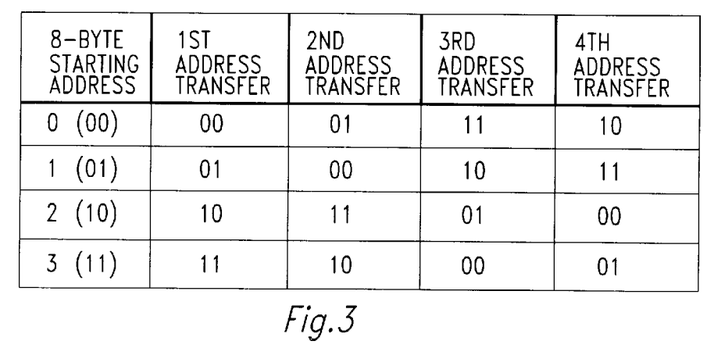
FIG. 3 is a table showing the sequence of data transfer in the high performance/low power mode of a preferred embodiment of the present invention.

FIG. 3 illustrates the burst data transfer order of an alternate embodiment. The burst data transfer order of FIG. 3 lowers the power consumption during burst mode. The format of FIG. 3 is the same as in FIG. 2. As shown in FIG. 3, the first and second data groups transferred are the same as illustrated in FIG. 2 and satisfy requirements 1) and 2) above. The transfer addresses for the third and fourth data groups are selected so as to require switching the least number of address lines. In this power optimized burst transfer order, only one bit changes between all adjacent addresses. This reduces the power consumed by microprocessor 110. Each change in the address output from BIU 112 requires changing the digital state of only one address line. Since driving external components, such as the address lines of Bbus, requires much more power than driving lines internal to microprocessor 110, this burst sequence reduces the power consumed by microprocessor 110. In many applications, such as portable laptop or notebook computers, the goal of minimizing power consumption predominates over the goal of simplicity of hardware design. Thus the burst order illustrated in FIG. 3 may be advantageous over the burst order illustrated in FIG. 2.

Figure 4:
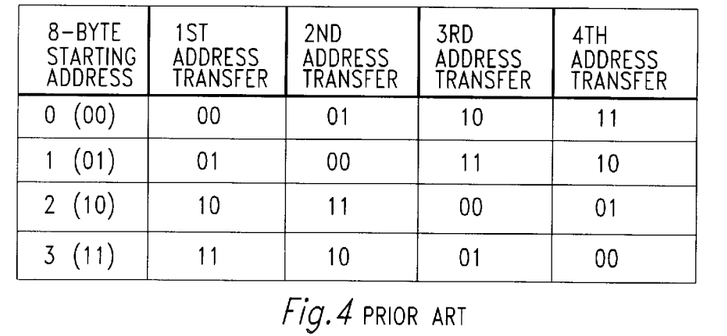
FIG. 4 is a table showing the sequence of data transfer in a prior art burst mode.

One of the advantages of burst data transfer between a microprocessor and an external system is the knowledge that a certain burst order is to be followed. This allows some of the set-up operations for the transfer to be handled by the external memory system, making the transfers more efficient. One widely used burst order, known as the Intel burst order, is described in the above mentioned patents, U.S. Pat. No. 5,131,083 and U.S. Pat. No. 5,255,378. As taught in these patents, the Intel burst order results by exclusive ORing a count incrementing from "00" to "11" with the starting address. This burst order is illustrated in FIG. 4. In particular, some chip sets of auxiliary logic circuits used with a microprocessor in constructing desk top computers always respond to this Intel burst order based upon the initial address transmitted by the microprocessor regardless of the actual addresses transmitted in the second, third and fourth transfer cycles. In order to be useful in conjunction with such chip sets, a microprocessor must employ a burst order compatible with the Intel burst order.

In accordance with another aspect of this invention, the user may optionally select a burst order compatible with the Intel burst order. In the past, microprocessors designed to follow a particular burst order were unable to interface with existing systems that follow another burst order. The optional use of the burst order compatible with the Intel burst order is referred to as the "compatibility mode" of this invention.

Figure 5:
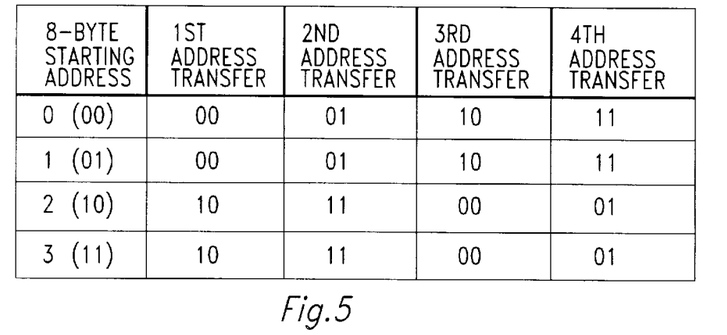
FIG. 5 is a table showing the sequence of data transfer in compatibility mode of a preferred embodiment of the present invention.

In the compatibility mode of operation, the objective is to fill the L1 cache by completion of the initial two transfers of groups of data, while ensuring that the data initially requested is included in one of those two transfers. To optimize efficiency of address selection implementations, the transfer addresses for these two transfers are sequentially increasing. Using the exemplary sizes presented above, the starting address requested is aligned by the lower L/4 bytes. By the end of the second data transfer, the processor is certain to have received the initially requested data. Thereafter, the rest of the data is transferred following a sequentially increasing address order. This burst order may result in the first data transfer not including the data initially requested. There is a slight performance penalty with this burst order. In half of the transfers one extra cycle is required to receive the initially requested data in the request queue.

The compatibility mode burst order is illustrated in FIG. 5. Data transfers in the compatibility mode are compatible with the Intel burst order illustrated in FIG. 5. While compatible with the Intel burst order illustrated in FIG. 4, nonetheless the compatibility mode illustrated in FIG. 5 has certain advantages. In the compatibility mode, starting addresses of "00" and "01" are aligned to "00", and starting addresses of "10" and "11" are aligned to "10". This is ideal for accesses made at 16 byte boundaries. Transferring the first 16 bytes enables the pipeline to proceed without having to wait for all 256 bits to be transferred. For the remaining bits, a simple increasing wrap-around address order is used.

Figure 6:
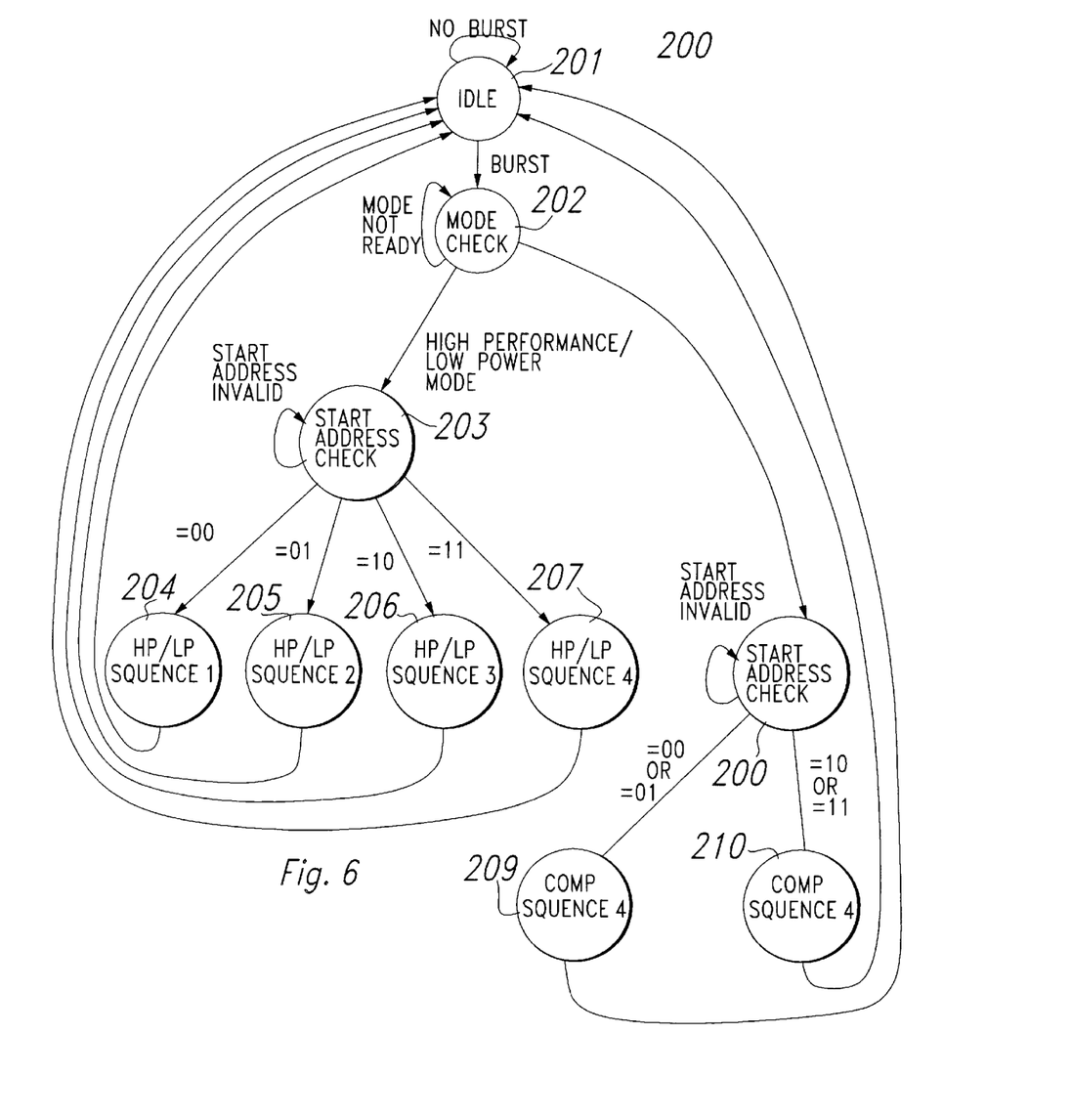
FIG. 6 is a state diagram for a state machine controlling a preferred embodiment of this invention.

FIG. 6 illustrates a state diagram 200 of a state machine implementing the selected mode operation of the preferred embodiment of this invention. The state diagram 200 is implemented by a state machine of conventional construction included within BIU 112 of microprocessor 110. The state diagram of FIG. 6 is identical for a combination of the high performance burst order and the compatibility burst order and for a combination of the low power burst order and the compatibility burst order. Due to the similarity, these two alternative embodiments will be discussed together.

State 201 is an initial idle state in which no burst data transfer is requested or in progress. So long as no burst data transfer is requested, the state machine remains in idle state 201.

Upon detection of a burst data transfer request, the state machine advances to mode check state 202. In mode check state 202 the state machine tests the state of an external pin 150 sensed during the last RESET. In the preferred embodiment, BIU 112 senses the voltage on external pin 150 during RESET. As is known in the art, microprocessor 110 enters RESET upon initial application of electrical power and possibly other events. The voltage placed upon external pin 150 is preferably either the power supply voltage for microprocessor 110 or ground. This voltage may be permanently selected by the original equipment manufacture using printed circuit lines or may be selectable by the end user using a switch. During RESET the voltage is sensed and a mode latch is set in one of two possible states based upon this voltage. In mode check state 202 the state of this mode latch is determined. The state machine remains in mode check state 202 during any interval when a valid mode signal has not been received. One of the states of this mode latch indicates a high performance burst order or a low power burst order. The other state of the mode latch indicates the compatibility burst order.

Upon detection of the high performance mode or the low power mode, the state machine advances to start address check state 203. The state machine remains in start address check state 203 until the start address of the requested data transfer is received. Based upon the two bits A of the start address, the state machine advances to one of four states 204 to 207. If the start address of the requested data transfer is "00", then the state machine advances to high performance/low power sequence 1 state 204. In high performance/low power sequence 1 state 204, the state machine produces the burst address sequence for a starting address of "00". The state machine produces this sequence of addresses one at a time during successive data transfer cycles. In the case of the high performance burst order, this address sequence is "00", "01", "10" and "11" in accordance with the first row of the table of FIG. 2. In the case of the low power burst order, this address sequence is "00", "01", "11" and "10" in accordance with the first row of the table of FIG. 3. As explained above, the addresses in the address sequence include the identical high order bits x and optionally also include the byte bits d if the external memory requires them. No special additional knowledge beyond that commonly known in the art is required to produce this sequences of addresses. If the start address of the requested data transfer is "01", then the state machine advances to high performance/low power sequence 2 state 205. In high performance/low power sequence 2 state 205, the state machine produces the burst address sequence for a starting address of "01" according to the second row of FIG. 2 in the case of the high performance burst order or according to the second row of the table of FIG. 3 in the case of the low power burst order. If the start address of the requested data transfer is "10", then the state machine advances to high performance/low power sequence 3 state 206. In high performance/low power sequence 3 state 206, the state machine produces the burst address sequence for a starting address of "10" according to the third row of FIG. 2 in the case of the high performance burst order or according to the third row of the table of FIG. 3 in the case of the low power burst order. If the start address of the requested data transfer is "11", then the state machine advances to high performance/low power sequence 4 state 207. In high performance/low power sequence 4 state 207, the state machine produces the burst address sequence for a starting address of "11" according to the bottom row of FIG. 2 in the case of the high performance burst order or according to the bottom row of the table of FIG. 3 in the case of the low power burst order. Following generation of the address sequence by any one of the states 204, 205, 206 or 207, the state machine completes the burst data transfer and returns to idle state 201.

Upon detection of the compatibility mode, the state machine advances to start address check state 208. The state machine remains in start address check state 208 until the start address of the requested data transfer is received. Based upon the two bits A of the start address, the state machine advances to one of two states 209 or 210. If the start address of the requested data transfer is either "00" or "01", then the state machine advances to compatibility sequence 1 state 209. In compatibility sequence 1 state 209, the state machine produces the burst address sequence in accordance with the first and second rows of the table of FIG. 4. Note that the address sequence is identical for these two starting addresses. If the start address of the requested data transfer is either "10" or "11", then the state machine advances to compatibility sequence 2 state 210. In compatibility sequence 2 state 210, the state machine produces the burst address sequence in accordance with the identical third and fourth rows of the table of FIG. 4. Following generation of the address sequence by any either of the states 209 or 210, the state machine completes the burst data transfer and returns to idle state 201.

The high performance burst order illustrated in FIG. 2 and the low power burst order illustrated in FIG. 3 for a B/b ratio of 4 may be extended to various size combinations. The concepts are applicable to any values of b, B and L, meaning that when there are more or less levels of hierarchy in the memory system, the same concepts in byte ordering of burst data may be applied for optimum performance and low power dissipation. In the examples illustrated in FIGS. 7 and 8 discussed below, there are three bits A used to select one of eight addresses for data transfer.

Figure 7:
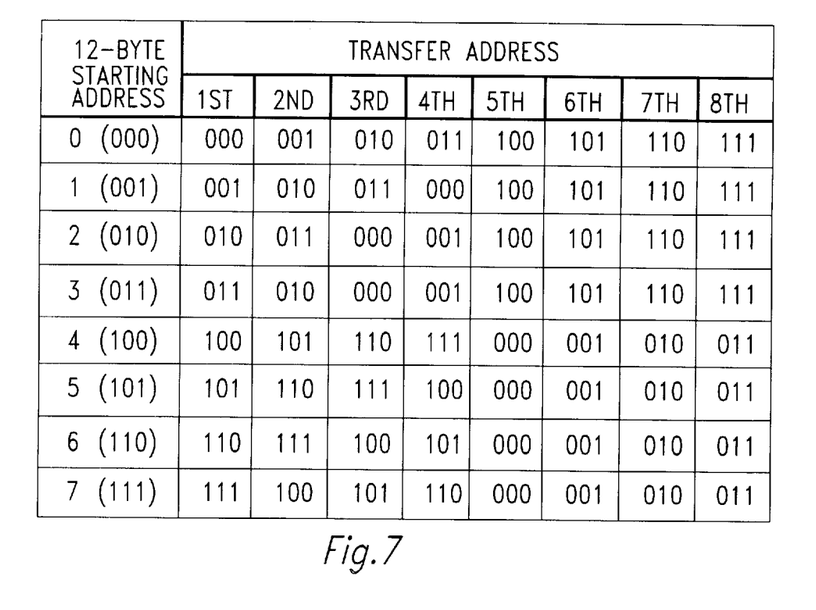
FIG. 7 is a table showing the sequence of data transfer in the high performance mode of a preferred embodiment of the present invention in which the burst occurs in eight cycles.

FIG. 7 illustrates a high performance burst order for a B/b ratio of 8. In this high performance burst order the goal is to complete the first L/4 bytes as soon as possible, which leads to the selection of a 32 byte boundary, as contrasted with the previous 16 byte boundary used in the examples illustrated in FIGS. 2 and 3. The high performance burst order shown in FIG. 7 is optimized for high performance, similar to the high performance burst order shown in FIG. 2.

Figure 8:
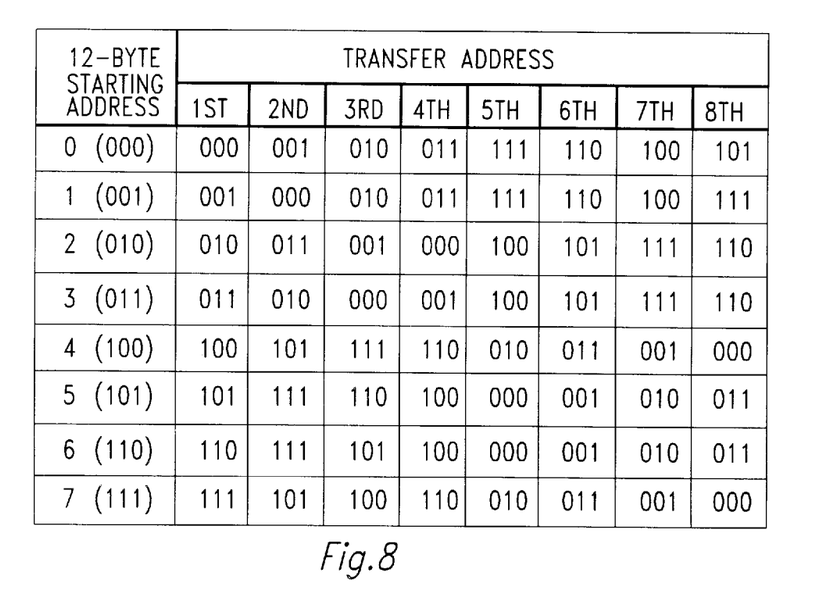
FIG. 8 is a table showing the sequence of data transfer in the high performance/low power mode of a preferred embodiment of the present invention in which the burst occurs in eight cycles.

FIG. 8 shows a low power burst order for a B/b ratio of 8. This low power burst order is optimized not only for high performance but also for low power. The low power burst order illustrated in FIG. 8 utilizes the same concepts applied to optimize the high performance burst order of FIG. 2 to produce the low power burst order of FIG. 3. In the low power burst order illustrated in FIG. 8 only one bit changes between all adjacent boundary addresses. As discussed above in conjunction with the low power burst order of FIG. 3, limiting the address change to a single bit reduces the power consumed by microprocessor 110.

Those skilled in the art would easily understand how to modify the state diagram 200 of FIG. 6 in order to provide control for the 8 data transfer bursts illustrated in FIGS. 7 and 8.

Although the present invention and its advantages have been described in detail, it should be understood that various changes, substitutions and alterations can be made herein without departing from the spirit and scope of the invention as defined by the appended claims.

What is claimed is:

1. A method of operating a microprocessor for burst transfer of plural data groups between an external bus having a predetermined data bus width b and the microprocessor, the microprocessor including a cache memory having a plurality of cache lines, each cache having a predetermined line width B, where B/b is 4, each cache line having four data groups denominated in order of increasing address as first, second, third and fourth data groups, each data group having b bits and the data transferred during said burst transfer having four data groups and a total of B bits, comprising the steps of:

generating within said microprocessor an initial address corresponding to an initial data group;

determining whether to initiate a burst transfer of plural data groups;

if it is determined to initiate a burst transfer of plural data groups, the substeps of:

if said initial data group corresponds to said first data group generating a sequence of addresses corresponding said first data group, said second data group, said third data group and said fourth data group and transferring data between said data bus and an appropriately aligned portion of a cache line of said cache memory, if said initial data group corresponds to said second data group generating a sequence of addresses corresponding said second data group, said first data group, said third data group and said fourth data group and transferring data between said data bus and an appropriately aligned portion of a cache line of said cache memory, if said initial data group corresponds to said third data group generating a sequence of addresses corresponding said third data group, said fourth data group, said first data group and said second data group and transferring data between said data bus and an appropriately aligned portion of a cache line of said cache memory, and if said initial data group corresponds to said fourth data group generating a sequence of addresses corresponding said fourth data group, said third data group, said first data group and said second data group and transferring data between said data bus and an appropriately aligned portion of a cache line of said cache memory.

2. The method of claim 1, wherein:

said burst transfer of plural data groups consists of a data read of data from said external bus to said microprocessor;

said step of determining whether to initiate a burst transfer consists of determining whether said initial data group is stored in said cache memory.

3. The method of claim 1, wherein:

said burst transfer of plural data groups consists of a data write of data from said microprocessor to said external bus.

4. The method of claim 1, further comprising the steps of:

following determination to initiate a burst transfer of plural data groups, determining if a burst mode indicator indicates a compatibility mode; and if said initial data group is not stored within said cache memory and said burst mode indicator indicates said compatibility mode generating a burst transfer of plural data groups including the substeps of:

if said initial data group corresponds to said first data group or corresponds to said second data group generating a sequence of addresses corresponding said first data group, said second data group, said third data group and said fourth data group and transferring data between said data bus and an appropriately aligned portion of a cache line of said cache memory, and if said initial data group corresponds to said third data group or corresponds to said fourth data group generating a sequence of addresses corresponding said third data group, said fourth data group, said first data group and said second data group and transferring data between said data bus and an appropriately aligned portion of a cache line of said cache memory.

5. The method of claim 4, wherein:

said burst mode indication is the voltage level on a predetermined pin of said microprocessor upon reset of the microprocessor.

6. A method of operating a microprocessor for burst transfer of plural data groups from an external bus having a predetermined data bus width b to the microprocessor, the microprocessor including a cache memory having a plurality of cache lines, each cache having a predetermined line width B, where B/b is 4, each cache line having four data groups denominated in order of increasing address as first, second, third and fourth data groups, each data group having b bits and the data transferred during said burst transfer having four data groups and a total of B bits, comprising the steps of:

generating within said microprocessor an initial address corresponding to an initial data group;

determining whether to initiate a burst transfer of plural data groups;

if it is determined to initiate a burst transfer of plural data groups, the substeps of:

if said initial data group corresponds to said first data group generating a sequence of addresses corresponding said first data group, said second data group, said fourth data group and said third data group and transferring data between said data bus and an appropriately aligned portion of a cache line of said cache memory, if said initial data group corresponds to said second data group generating a sequence of addresses corresponding said second data group, said first data group, said third data group and said fourth data group and transferring data between said data bus and an appropriately aligned portion of a cache line of said cache memory, if said initial data group corresponds to said third data group generating a sequence of addresses corresponding said third data group, said fourth data group, said second data group and said first data group and transferring data between said data bus and an appropriately aligned portion of a cache line of said cache memory, and if said initial data group corresponds to said fourth data group generating a sequence of addresses corresponding said fourth data group, said third data group, said first data group and said second data group and transferring data between said data bus and an appropriately aligned portion of a cache line of said cache memory.

7. The method of claim 6, wherein:

said burst transfer of plural data groups consists of a data read of data from said external bus to said microprocessor;

said step of determining whether to initiate a burst transfer consists of determining whether said initial data group is stored in said cache memory.

8. The method of claim 1, wherein:

said burst transfer of plural data groups consists of a data write of data from said microprocessor to said external bus.

9. The method of claim 6, further comprising the steps of:

following determination to initiate a burst transfer of plural data groups, determining if a burst mode indicator indicates a compatibility mode; and if said initial data group is not stored within said cache memory and said burst mode indicator indicates said compatibility mode generating a burst transfer of plural data groups including the substeps of:

if said initial data group corresponds to said first data group or corresponds to said second data group generating a sequence of addresses corresponding said first data group, said second data group, said third data group and said fourth data group and transferring data between said data bus and an appropriately aligned portion of a cache line of said cache memory, and if said initial data group corresponds to said third data group or corresponds to said fourth data group generating a sequence of addresses corresponding said third data group, said fourth data group, said first data group and said second data group and transferring data between said data bus and an appropriately aligned portion of a cache line of said cache memory.

10. The method of claim 9, wherein:

said burst mode indication is the voltage level on a predetermined pin of said microprocessor upon reset of the microprocessor.

11. A method of operating a microprocessor for burst transfer of plural data groups from an external bus having a predetermined data bus width b to the microprocessor, the microprocessor including a cache memory having a plurality of cache lines, each cache having a predetermined line width B, where B/b is 8, each cache line having eight data groups denominated in order of increasing address as first, second, third, fourth, fifth, sixth, seventh and eighth data groups, each data group having b bits and the data transferred during said burst transfer having four data groups and a total of B bits, comprising the steps of:

generating within said microprocessor an initial address corresponding to an initial data group;

determining whether to initiate a burst transfer of plural data groups;

if it is determined to initiate a burst transfer of plural data groups, the substeps of:

if said initial data group corresponds to said first data group generating a sequence of addresses corresponding said first data group, said second data group, said third data group, said fourth data group, said fifth data group, said sixth data group, said seventh data group and said eighth data group, and transferring data between said data bus and an appropriately aligned portion of a cache line of said cache memory, if said initial data group corresponds to said second data group generating a sequence of addresses corresponding said second data group, said third data group, said fourth data group, said first data group, said fifth data group, said sixth data group, said seventh data group and said eighth data group, and transferring data between said data bus and an appropriately aligned portion of a cache line of said cache memory, if said initial data group corresponds to said third data group generating a sequence of addresses corresponding said third data group, said fourth data group, said first data group, said second data group, said fifth data group, said sixth data group, said seventh data group and said eighth data group, and transferring data between said data bus and an appropriately aligned portion of a cache line of said cache memory, and if said initial data group corresponds to said fourth data group generating a sequence of addresses corresponding said fourth data group, said third data group, said first data group, said second data group, said fifth data group, said sixth data group, said seventh data group and said eighth data group, and transferring data between said data bus and an appropriately aligned portion of a cache line of said cache memory, if said initial data group corresponds to said fifth data group generating a sequence of addresses corresponding said fifth data group, said sixth data group, said seventh data group, said eighth data group, said first data group, said second data group, said third data group and said fourth data group, and transferring data between said data bus and an appropriately aligned portion of a cache line of said cache memory, if said initial data group corresponds to said sixth data group generating a sequence of addresses corresponding said sixth data group, said seventh data group, said eighth data group, said fifth data group, said first data group, said second data group, said third data group and said fourth data group, and transferring data between said data bus and an appropriately aligned portion of a cache line of said cache memory, if said initial data group corresponds to said seventh data group generating a sequence of addresses corresponding said seventh data group, said eighth data group, said fifth data group, said sixth data group, said first data group, said second data group, said third data group and said fourth data group, and transferring data between said data bus and an appropriately aligned portion of a cache line of said cache memory, if said initial data group corresponds to said eighth data group generating a sequence of addresses corresponding said eighth data group, said fifth data group, said sixth data group, said seventh data group, said first data group, said second data group, said third data group and said fourth data group, and transferring data between said data bus and an appropriately aligned portion of a cache line of said cache memory.

12. The method of claim 11, wherein:

said burst transfer of plural data groups consists of a data read of data from said external bus to said microprocessor;

said step of determining whether to initiate a burst transfer consists of determining whether said initial data group is stored in said cache memory.

13. The method of claim 11, wherein:

said burst transfer of plural data groups consists of a data write of data from said microprocessor to said external bus.

14. A method of operating a microprocessor for burst transfer of plural data groups from an external bus having a predetermined data bus width b to the microprocessor, the microprocessor including a cache memory having a plurality of cache lines, each cache having a predetermined line width B, where B/b is 8, each cache line having eight data groups denominated in order of increasing address as first, second, third, fourth, fifth, sixth, seventh and eighth data groups, each data group having b bits and the data transferred during said burst transfer having four data groups and a total of B bits, comprising the steps of:

generating within said microprocessor an initial address corresponding to an initial data group;

determining whether to initiate a burst transfer of plural data groups;

if it is determined to initiate a burst transfer of plural data groups, the substeps of:

if said initial data group corresponds to said first data group generating a sequence of addresses corresponding said first data group, said second data group, said third data group, said fourth data group, said eighth data group, said seventh data group, said fifth data group and said sixth data group, and transferring data between said data bus and an appropriately aligned portion of a cache line of said cache memory, if said initial data group corresponds to said second data group generating a sequence of addresses corresponding said second data group, said first data group, said third data group, said fourth data group, said eighth data group, said seventh data group, said fifth data group and said sixth data group, and transferring data between said data bus and an appropriately aligned portion of a cache line of said cache memory, if said initial data group corresponds to said third data group generating a sequence of addresses corresponding said third data group, said fourth data group, said second data group, said third data group, said fifth data group, said sixth data group, said eighth data group and said seventh data group, and transferring data between said data bus and an appropriately aligned portion of a cache line of said cache memory, and if said initial data group corresponds to said fourth data group generating a sequence of addresses corresponding said fourth data group, said third data group, said first data group, said second data group, said fifth data group, said sixth data group, said eighth data group and said seventh data group, and transferring data between said data bus and an appropriately aligned portion of a cache line of said cache memory, if said initial data group corresponds to said fifth data group generating a sequence of addresses corresponding said fifth data group, said sixth data group, said eighth data group, said seventh data group, said third data group, said fourth data group, said second data group and said third data group, and transferring data between said data bus and an appropriately aligned portion of a cache line of said cache memory, if said initial data group corresponds to said sixth data group generating a sequence of addresses corresponding said sixth data group, said eighth data group, said seventh data group, said fifth data group, said first data group, said second data group, said third data group and said fourth data group, and transferring data between said data bus and an appropriately aligned portion of a cache line of said cache memory, if said initial data group corresponds to said seventh data group generating a sequence of addresses corresponding said seventh data group, said eighth data group, said sixth data group, said fifth data group, said first data group, said second data group, said third data group and said fourth data group, and transferring data between said data bus and an appropriately aligned portion of a cache line of said cache memory, if said initial data group corresponds to said eighth data group generating a sequence of addresses corresponding said eighth data group, said sixth data group, said fifth data group, said seventh data group, said third data group, said fourth data group, said second data group and said first data group, and transferring data between said data bus and an appropriately aligned portion of a cache line of said cache memory.

15. The method of claim 14, wherein:

said burst transfer of plural data groups consists of a data read of data from said external bus to said microprocessor;

said step of determining whether to initiate a burst transfer consists of determining whether said initial data group is stored in said cache memory.

16. The method of claim 16, wherein:

said burst transfer of plural data groups consists of a data write of data from said microprocessor to said external bus.

17. A microprocessor for burst transfer of plural data groups comprising:

an external bus having a predetermined data bus width b;

a cache memory having a plurality of cache lines, each cache line having a predetermined line width B, where B/b is 4, each cache line having four data groups denominated in order of increasing address as first, second, third and fourth data groups;

at least one address unit generating an initial memory address for microprocessor access;

a bus interface unit connected to said external bus, said cache memory and said at least one address unit, said bus interface unit determining whether to initiate a burst transfer of plural data groups;

if it is determined to initiate a burst transfer of plural data groups, then if said initial memory address corresponds to said first data group generating a sequence of addresses corresponding said first data group, said second data group, said third data group and said fourth data group and transferring data between said data bus and an appropriately aligned portion of a cache line of said cache memory, if said initial memory address corresponds to said second data group generating a sequence of addresses corresponding said second data group, said first data group, said third data group and said fourth data group and transferring data between said data bus and an appropriately aligned portion of a cache line of said cache memory, if said initial memory address corresponds to said third data group generating a sequence of addresses corresponding said third data group, said fourth data group, said first data group and said second data group and transferring data between said data bus and an appropriately aligned portion of a cache line of said cache memory, and if said initial memory address corresponds to said fourth data group generating a sequence of addresses corresponding said fourth data group, said third data group, said first data group and said second data group and transferring data, between said data bus and an appropriately aligned portion of a cache line of said cache memory.

18. The microprocessor of claim 17, wherein:

said burst transfer of plural data groups consists of a data read of data from said external bus to said microprocessor;

said step of determining whether to initiate a burst transfer consists of determining whether data corresponding said initial memory address is stored in said cache memory.

19. The microprocessor of claim 17, wherein:

said burst transfer of plural data groups consists of a data write of data from said microprocessor to said external bus.

20. The microprocessor of claim 17, further comprising:

an external mode pin;

said bus interface unit is further connected to said external mode pin, said bus interface unit detecting a voltage on said external pin upon reset of said microprocessor, determining if said detected voltage on said external pin has a first digital value, if said detected voltage on said external pin has said first digital value, said bus interface unit if said initial memory address corresponds to said first data group or corresponds to said second data group generating a sequence of addresses corresponding said first data group, said second data group, said third data group and said fourth data group and transferring data between said data bus and an appropriately aligned portion of a cache line of said cache memory, and  if said initial memory address corresponds to said third data group or corresponds to said fourth data group generating a sequence of addresses corresponding said third data group, said fourth data group, said first data group and said second data group and transferring data between said data bus and an appropriately aligned portion of a cache line of said cache memory.

21. A microprocessor for burst transfer of plural data groups comprising:

an external bus having a predetermined data bus width b;

a cache memory having a plurality of cache lines, each cache line having a predetermined line width B, where B/b is 4, each cache line having four data groups denominated in order of increasing address as first, second, third and fourth data groups;

at least one address unit generating an initial memory address for microprocessor access;

a bus interface unit connected to said external bus, said cache memory and said at least one address unit, said bus interface unit  determining whether to initiate a burst transfer of plural data groups;

if it is determined to initiate a burst transfer of plural data groups, then   if said initial memory address corresponds to said first data group generating a sequence of addresses corresponding said first data group, said second data group, said fourth data group and said third data group and transferring data between said data bus and an appropriately aligned portion of a cache line of said cache memory,   if said initial memory address corresponds to said second data group generating a sequence of addresses corresponding said second data group, said first data group, said third data group and said fourth data group and transferring data between said data bus and an appropriately aligned portion of a cache line of said cache memory,   if said initial memory address corresponds to said third data group generating a sequence of addresses corresponding said third data group, said fourth data group, said second data group and said first data group and transferring data between said data bus and an appropriately aligned portion of a cache line of said cache memory, and   if said initial memory address corresponds to said fourth data group generating a sequence of addresses corresponding said fourth data group, said third data group, said first data group and said second data group and transferring data between said data bus and an appropriately aligned portion of a cache line of said cache memory.

22. The microprocessor of claim 21, wherein:

said burst transfer of plural data groups consists of a data read of data from said external bus to said microprocessor;

said step of determining whether to initiate a burst transfer consists of determining whether data corresponding said initial memory address is stored in said cache memory.

23. The microprocessor of claim 21, wherein:

said burst transfer of plural data groups consists of a data write of data from said microprocessor to said external bus.

24. The microprocessor of claim 21, further comprising:

an external mode pin;

said bus interface unit is further connected to said external mode pin, said bus interface unit  detecting a voltage on said external pin upon reset of said microprocessor,  determining if said detected voltage on said external pin has a first digital value,  if said detected voltage on said external pin has said first digital value, said bus interface unit   if said initial memory address corresponds to said first data group or corresponds to said second data group generating a sequence of addresses corresponding said first data group, said second data group, said third data group and said fourth data group and transferring data between said data bus and an appropriately aligned portion of a cache line of said cache memory, and   if said initial memory address corresponds to said third data group or corresponds to said fourth data group generating a sequence of addresses corresponding said third data group, said fourth data group, said first data group and said second data group and transferring data between said data bus and an appropriately aligned portion of a cache line of said cache memory.

\* \* \* \* \*